United States Patent [19]

Mayer et al.

[11] 3,998,722

[45] Dec. 21, 1976

[54] HIGH TEMPERATURE HYDROCONVERSION WITHOUT INCOMPATIBLES FORMATION

[76] Inventors: Francis X. Mayer, 5277 Whitehaven, Baton Rouge, La. 70808; James H. Taylor, Jr., 5545 Melrose Blvd., Baton Rouge, La. 70806; David E. Mueller, 14543 Breton Blvd., Baton Rouge, La. 70816; Willard H. Sawyer, 425 Oak Hills Parkway, Baton, La. 70810

[22] Filed: Dec. 31, 1975

[21] Appl. No.: 645,640

[52] U.S. Cl. .................................. 208/112; 208/154; 208/157; 208/159; 208/216; 208/251 H; 208/264; 252/465; 252/477 R

[51] Int. Cl.$^2$ ..................... C10G 13/02; B01J 27/04

[58] Field of Search .......... 208/110, 112, 153, 159, 208/216, 251 H, 264

[56] References Cited

UNITED STATES PATENTS

| | | | |
|---|---|---|---|
| 2,987,465 | 6/1961 | Johanson | 208/10 |
| 3,681,231 | 8/1972 | Alpert et al. | 208/59 |
| 3,761,393 | 9/1973 | Wolk et al. | 208/108 |
| 3,817,856 | 6/1974 | Aaron et al. | 208/213 |
| 3,830,728 | 8/1974 | Mounce | 208/59 |
| 3,841,981 | 10/1974 | Layng | 208/48 Q |

*Primary Examiner*—Delbert E. Gantz
*Assistant Examiner*—G. E. Schmitkons
*Attorney, Agent, or Firm*—L. A. Proctor

[57] ABSTRACT

A hydrotreating process, particularly a hydroconversion process, wherein a hydrogenation catalyst is contacted with a hydrocarbon or hydrocarbonaceous feed containing 1050° F.+ materials at a preselected high initial temperature and maintained essentially at this temperature throughout an operating run. In accordance with such mode of operation certain advantages are obtained, these including: (1) greater overall conversion of 1050° F.+ to 1050° F.− hydrocarbon products at a given level of hydrodesulfurization, catalyst consumption rate, with the same reactor volume and pressure requirements; (2) greater overall reduction of Con carbon; and (3) improved overall feed metals reduction.

11 Claims, No Drawings

HIGH TEMPERATURE HYDROCONVERSION WITHOUT INCOMPATIBLES FORMATION

Processes for hydrotreating hydrocarbon or hydrocarbonaceous feedstocks, including particularly heavy petroleum crudes and residua, are well known and such processes are widely disclosed in the patent literature. Such feedstocks often give rise to an incompatibility problem in that they contain considerable amounts of heavy oils, resins, nondistillable asphaltenes, i.e., pentane ($C_5$) or heptane insoluble compounds, high molecular weight coke precursors, and metalloorganic complexes, or metal contaminants, as well as high nitrogen, sulfur, and oxygen which, when subjected to heat, coagulate, polymerize or decompose and create materials difficult to further process. The incompatibility problem becomes particularly acute at high temperatures, perhaps due to competing thermal cracking and hydrogenation reactions which become unbalanced such that incompatible materials fall out of solution, foul and plug reactor and auxiliary equipment, and contaminate the products. Because of this problem in the past, the lower molecular weight or gas oil portion of such feedstocks has been catalytically converted and upgraded to high value fuels, while the heavy ends or 1050° F. + materials (known as the "bottom of the barrel" materials) were split out, then generally used as low grade fuel or asphaltic materials. Recent economics, however, have made it necessary to hydrotreat even the 1050° F. + residues to desulfurize these materials, due to the environmental hazards created by burning the sulfur-containing fuels.

Resid hydrodesulfurization processes have thus evolved which require severities sufficient to cause the breakage of carbon-sulfur bonds of the relatively low molecular weight hydrocarbons, with subsequent hydrogenation of the sulfur moieties to eliminate the sulfur which is evolved as hydrogen sulfide gas. Even more stringent conditions are now being required of new generation processes wherein feeds containing 1050° F. + hydrocarbon materials are converted to lower molecular weight hydrocarbons at high temperatures and pressures. For example, in Johanson's U.S. Pat. No. 2,987,465, a hydrocarbon feed and gas are passed upwardly through an ebullating bed of particulate catalytic solids. The process is conducted under conditions which establish a random motion of the catalytic particles in the liquid without carrying the solids out of the reactor. Based on the solid size and density of the catalyst particles, and liquid density, velocity and viscosity, the mass of particulate solids is expanded from a volume of about 10 percent greater than that of the settled state of the mass to perhaps two or three times the settled volume. A major difficulty associated with the operation of this process is directly related with the incompatibility problem. In processing residua, inter alia, a tarry, sticky material is formed upon and apparently absorbed by the catalyst particles, this all too rapidly fouling the catalyst. Conglomeration of the catalyst particles produces channeling and lowering of catalyst performance. Reactor and auxiliary equipment become fouled with precipitated materials, and product streams are contaminated.

In view of present supply and demand considerations, it is imperative that new and improved processes be developed for the hydrotreatment of whole heavy crudes and residua, particularly for the hydroconversion of the 1050° F. + portion of these materials to chemically alter and form lower molecular weight compounds boiling below 1050° F., i.e. 1050° F.−. Not only are there many such materials on hand which must be upgraded, but improved processes can make it possible to hydroconvert new types of heavy crudes and residua which contain great amounts of 1050° F.+ materials, which crudes and residua cannot be handled by present hydroconversion processes. Such crudes and residua, e.g., unconventional materials such as Athabasca tar sands, Canadian and Venezuelan heavy oils and Venezuelan heavy tars, and including liquids from coal liquefaction processes, are different from conventional crudes in at least four important aspects, each of which makes hydroconversion of such crudes by present methods entirely unfeasible—viz., they have (1) very high Conradson carbon (i.e., "Con. carbon") or carbon-to-hydrogen ratios (i.e., relatively high carbon and low hydrogen content), (2) very high metals content, (3) an ultra-high content of materials boiling above 1050° F., e.g., asphaltenes, and (4) contain considerable amounts of sand and scale.

It is particularly difficult, nonetheless, to treat crudes or residuas which contain large amounts of 1050° F.+ hydrocarbons, even where there is no significant conversion of hydrocarbon to lower boiling products. Even hydrodesulfurization processes, which have been recognized as potentially useful for effecting the removal of sulfur from such fuels, have been relatively ineffective for the hydrotreatment of residua. High operating costs associated with the relatively high pressures required, high hydrogen consumption and short catalyst life, inter alia, have hindered commercial utilization of such processes. The hydroconversion of 1050° F.+ hydrocarbon materials to more useful lower boiling hydrocarbons presents an acutely more difficult problem.

Certain of our colleagues have nonetheless addressed themselves to a solution of such problems, as illustrated by pending application Ser. No. 533,314, filed Dec. 16, 1974 (now U.S. Pat. No. 3,977,961), which is a continuation-in-part of abandoned Application Serial No. 440,303, filed February 7, 1974, by G. P. Hamner; Application Serial No. 533,299, filed December 16, 1974 (now U.s. Pat. No. 3,977,962), which is a continuation-in-part of abandoned application Ser. No. 440,285 by W. F. Arey, Jr. et al.; application Ser. No. 533,300 (now U.S. Pat. No. 3,993,598), filed Dec. 16, 1974, which is a continuation-in-part of abandoned application Ser. No. 440,290 by W. F. Arey, Jr. et al.; application Ser. No. 533,301, filed Dec. 16, 1974, which is a continuation-in-part of abandoned application Ser. No. 440,315 by G. P. Hamner; application Ser. No. 533,311 (now U.S. Pat. No. 3,989,645), filed Dec. 16, 1974, which is a continuation-in-part of abandoned application Ser. No. 440,302 by W. F. Arey, Jr. et al.; application Ser. No. 533,312, filed Dec. 16, 1974 (now U.S. Pat. No. 3,993,599), which is a continuation-in-part of abandoned application Ser. No. 440,316 by W. J. Mattox; application Ser. No. 533,331, filed Dec. 16, 1974 (now U.S. Pat. No. 3,985,684), which is a continuation-in-part of application Ser. No. 440,301 by W. F. Arey, Jr. et al.; and application Ser. No. 533,313, filed Dec. 16, 1974 (now U.S. Pat. No. 3,993,601), which is a continuation-in-part of abandoned application Ser. No. 440,302 by F. M. Long et al.; all of which are herewith included by reference. These applications describe new and improved catalysts, and hydroconversion processes, or processes for cracking the 1050° F.+ hydrocarbon portion of heavy whole crudes and residua to yield therefrom lighter boiling usable products, particularly from unconventional heavy crudes and residua which contain appreciable amounts of sulfur and nitrogen, high quantities of the so-called heavy metals, e.g., nickel and vanadium, as well as high "Con. carbon," high carbon-to-hydrogen ratios, high asphaltenes, ash, sand, scale, and the like.

In the practice of our colleague's process, albeit the catalysts used in this process offer advantages over conventional catalysts, the catalyst gradually deactivates. Coke gradually deposits on the catalyst, particularly at the high temperatures required for the reaction, and masks reaction sites. Channels within the catalysts become blocked and the number of reaction sites are progressively diminished. To compensate for the decreased activity, it is conventional in the operation of this process, as in prior art proceses, to gradually increase the temperature as the run progresses. The maintenance of catalytic activity in this manner is often used as a measure of catalyst activity, and is generally referred to as the temperature increase requirement (TIR) of a catalyst. TIR is usually measured in ° F./day. In any event, whereas such process has proven admirably suitable for hydroprocessing 1050° F.+ residua, the incompatibility problem has yet to be completely solved. It is believed, particularly at the high temperatures required for hydroconversion, that the rate of thermal cracking is increased at a faster rate than the hydroconversion rate. Side chains are removed by cleavage from the molecules, and the modified hydrocarbons become more insoluble in the feed of increased paraffinicity. Incompatible materials form and fall out of solution. This not only causes an increased rate of deactivation of the catalyst, but also produces materials which cause fouling of the reactor and auxiliary equipment, and contaminates the products. Accordingly, a primary objective of the present invention is to obviate these deficiencies.

A particular object is to provide an improved process, particularly useful in hydrotreating reactions, particularly reactions involving the hydroconversion of the 1050° F.+ hydrocarbon portion of heavy crudes and residua.

A further specific object is to provide an improved hydroconversion process useful in converting the 1050° F.+ hydrocarbon portion of feeds comprising heavy crudes and residua to useful lower boiling products while simultaneously producing appreciable Con. carbon reduction, hydrodesulfurization, hydrodenitrogenation and demetallization of the feeds.

A more specific object is to provide a process useful in achieving a high level of conversion of the 1050° F+ materials to produce products boiling in the gas oil range, these latter products being suitable as catalytic cracker feeds which can be converted into gasoline and mid distillates.

These objects and others are achieved in accordance with the present invention which embodies a hydrotreating process, conducted with a catalyst containing a hydrogenation component, suitably a Group VIB or Group VIII metal, or mixture of these with each other or with other metals, in a hydrogenation zone (comprised of one or more reactors, each containing one or more stages) wherein a hydrocarbon or hydrocarbonaceous feed (e.g., a coal liquid, whole heavy crude or residua), containing 1050° F.+ hydrocarbons is contacted, in the presence of hydrogen, at an initial temperature sufficient to maximize the amount of conversion of the 1050° F+ hydrocarbon feed to 1050° F− hydrocarbon products, but insufficient to form any significant amount of incompatible materials, while substantially maintaining said temperature throughout the operation. Suitably, the temperature (Equivalent Isothermal Temperature) is maintained within a range of from about 775° F. to about 825° F., preferably within a range of from about 795° F. to about 805° F. throughout the operation. Ideally, the temperature is maintained substantially constant throughout the run at that temperature wherein maximum conversion of the 1050° F.+ feed to 1050° F.− products is obtained, without the formation of any significant amount of incompatibles; but practical considerations necessitate some deviation, generally within a range of about +5° F. from a true constant temperature mode of operation.

A constant temperature mode of operation (i.e. a temperature about +5° F. from a temperature selected to provide maximum instantaneous conversion without significant incompatible formation) provides a number of advantages over the conventional temperature increase mode of operation, these including: (1) greater overall conversion of 1050° F.+ to 1050° F.− hydrocarbon products at a given level of hydrodesulfurization, catalyst consumption rate, with the same reactor volume and pressure requirements; (2) greater overall reduction of Con carbon; and (3) improved overall feed metals reduction.

Relatively large uniform pore catalyst, particularly those having an essential combination of properties regarding pore size (or pore size distribution), surface area and pore volume are preferred. Such catalysts provide selectivity for conversion and demetallization of whole heavy crudes and residua, in the presence of added hydrogen, which contains relatively large quantities of 1050° F.+ materials, i.e., asphaltenes ($C_5$ insoluble) and other large hydrocarbon molecules, which are effectively converted to lower molecular weight products. Such catayists necessarily comprise catalytically active amounts of a hydrogenation component which includes a Group VIB or Group VIII metal (especially a Group VIII nonnoble metal), or both (Periodic Table of the Elements, E. H. Sargent and Co., Copyright 1962 Dyna-Slide Co.), particularly molybdenum or tungsten of Group VIB, and cobalt or nickel of Group VIII, and preferably a Group VIB and Group VIII metal in admixture one metal with the other, or with other metals, or both, particularly Group IVA metals, composited with a refractory inorganic support, notably a porous, inorganic oxide support, particularly alumina, or more particularly gamma alumina. Such catalysts are also characterized as including a combination of properties comprising, when the catalyst is of size ranging up to 1/50 inch average particle size diameter, at least about 20 percent, preferably at least about 25 percent, and more preferably at least about 70 percent of its total pore volume of absolute diameter within the range of about 100A (Angstrom units) to about 200A; when the catalyst is of size ranging from about 1/50 inch up to 1/25 inch average particle size diameter, at least about 15 percent, preferably at least about 20 percent, and more preferably at least about 45 percent of its total pore volume of absolute diameter within the range of about 150A to about 250A; when the catalyst is of size ranging from about 1/25 inch to about ⅛ inch average particle size diameter, at least about 15 percent, preferably at least about 20 percent, and more preferably at least about 30 percent of its total pore volume of absolute diameter within the range of about 175A to about 275A; wherein, in each of these catalysts of differing ranges of particle size distributions, the pore volumes resultant from pores of 50A, and smaller, i.e., 50A—, are minimized; and preferably, while in catalyst average particle size below 1/50 inch, the pore volume resultant from pores of diameter above 300A, i.e., 300A+, is minimized, and in catalysts of average particle size above 1/50 inch, the pore volume resultant from pores above 350A, i.e., 350A+, is minimized; the surface areas and pore volumes of the catalysts being interrelated with particle size, and pore size distributions, surface areas ranging at least about 200 m²/g to about 600 m²/g, and preferably at least about 250 m²/g to about 450 m²/g, with pore volumes ranging from about 0.8 to about 3.0 cc/g, and preferably from about 1.1 to about 2.3 cc/g (B.E.T.).

Particularly preferred catalysts are characterized as follows:

| Distribution of Pore Diameters[1] | Marginal | Preferred | More Preferred |
|---|---|---|---|
| 1/500 up to 1/50″[2] | | | |
| 0–50A | <20% | <10% | <2% |
| 100–200A | >20% | >25% | >70% |
| 300A+ | <30% | <25% | <1% |
| Pore Volume, cc/g | 0.8–1.4 | 0.9–1.5 | 1.1–1.7 |
| Surface Area, m²/g | 300–450 | 310–500 | 325–550 |
| 1/50 up to 1/25″[2] | | | |
| 0–50A | <10% | <5% | <1% |
| 150–250A | >15% | >20% | >45% |
| 350A+ | <35% | <30% | <7% |
| Pore Volume, cc/g | 1.1–1.7 | 1.3–1.9 | 1.5–2.1 |
| Surface Area, m²/g | 320–475 | 340–575 | 360–600 |
| 1/25 up to 1/8″[2] | | | |
| 0–50A | <5% | <4% | <3% |
| 175–275A | >15% | >20% | >30% |
| 350A+ | <40% | <35% | <25% |
| Pore Volume, cc/g | 1.3–1.9 | 1.5–2.1 | 1.8–2.3 |
| Surface Area, m²/g | 340–500 | 350–600 | 370–650 |

[1]Measured by nitrogen adsorption isotherm, wherein nitrogen adsorbed is at various pressures. Technique described in Ballou et al, Analytical Chemistry, Vol. 32, April, 1960, using Aminco Adsorptomat [(Catalogue No. 4–4680) and Multiple Sample Accessory (Catalogue No. 4–4685) Instruction No. 861-A] which uses the principle of adsorption and desorption of gas by a catalyst specimen at the boiling point of nitrogen.
[2]Average particle diameter in inches.

Suitably, the composition of the catalysts comprises from about 5 to about 50 percent, preferably from about 15 to about 25 percent (as the oxide) of the Group VIB metal, and from about 1 to about 12 percent, preferably from about 4 to about 8 percent (as the oxide) of the Group VIII metal, based on the total weight (dry basis) of the composition. The preferred active metallic components, and forms thereof, comprise an oxide or sulfide of molybdenum and tungsten of Group VIB, an oxide or sulfide of nickel or cobalt of Group VIII, preferably a mixture of one of said Group VIB and one of said Group VIII metals, admixed one with the other and inclusive of third metal components of Groups VIB, VIII and other metals, particularly Group IVA metals. The preferred catalysts are constituted of an admixture of cobalt and molybdenum, but in some cases the catalysts may be comprised of nickel and molybdenum. Other suitable Group VIB and VIII metals include, for example, chromium, platinum, palladium, iridium, osmium, ruthenium, rhodium, and the like. The inorganic oxide supports suitably comprise alumina, silica, zirconia, magnesia, boria, phosphate, titania, ceria, thoria, and the like. The preferred support is alumina, preferably gamma alumina, and the alumina can be stabilized with silica in concentration ranging from about 0.1 to about 20 percent, preferably from about 10 to about 20 percent, based on the total weight (dry basis) alumina-silica composition (inclusive of metal components). The catalyst composition can be in the form of beads, spheres, aggregates of various particle sizes, extrudates, tablets or pellets, depending upon the type of process and conditions to which the catalyst is to be exposed.

Particularly preferred catalysts are composites of nickel or cobalt oxide with molybdenum, used in the following approximate proportions: from about 1 to about 12 weight percent, preferably from about 4 to about 8 weight percent of nickel or cobalt oxides; and from about 5 to about 50 weight percent, preferably from about 15 to about 25 weight percent of molybdenum oxide on a suitable support, such as alumina. The catalyst is sulfided to form the most active species.

The catalysts can be used in the reaction zones as fixed beds, ebullating beds or in slurry form within beds. When used in the form of fixed beds, the particle size diameter of the catalysts generally ranges from about 1/32 to about ⅛ inch, preferably about 1/16 inch. When used as ebullating beds the catalysts generally range about 1/32 inch diameter and smaller, and when used as slurry beds the particle sizes generally range from about 100 to about 400 microns. The bulk density of the catalyst generally ranges from about 0.2 to about 0.6 g/cc, preferably from about 0.2 to about 0.5 g/cc, depending on particle size.

In the practice of such process, in an initial or first reaction zone comprising one or more stages (and in one or more reactors), a hydrocarbon or hydrocarbonaceous feed containing 1050° F.+ hydrocarbon materials, especially one having the following characteristics:

| | Operable Range | Preferred Range |
|---|---|---|
| Gravity, ° API | −5 to 20 | 0–14 |
| Heavy Metals (Ni & V), ppm | 5–1000 | 200–600 |
| 1050° F. +, Wt. % | 10–100 | 40–100 |
| Asphaltenes (C₅ insolubles), Wt. % | 5–50 | 15–30 |
| Con. Carbon, Wt. % | 5–50 | 10–30 | is contacted, in the presence of hydrogen, at severities sufficient to convert at least about 30 percent by weight and preferably from about 40 percent to about 90 percent of the 1050° F.+ materials of the crude or residua present to 1050° F.− materials, remove at least about 75 percent, and preferably from about 80 to about 95 percent, by weight of the metals, preferably producing product having the following characteristics:

| | Operable Range | Preferred Range | More Preferred Range |
|---|---|---|---|
| Gravity, ° API | 14–35 | 20–30 | 25–30 |
| Heavy Metals (Ni & V), ppm | 0–75 | 1–30 | 1–5 |
| 1050° F. +, Wt. % | 0–40 | 5–30 | 5–10 |
| Asphaltenes (C₅ insolubles), Wt. % | 1–15 | 1–10 | 1–3 |

-continued

|  | Operable Range | Preferred Range | More Preferred Range |
|---|---|---|---|
| Con. Carbon, Wt. % | 1–15 | 1–10 | 1–3 |

The product characterized as falling within the more preferred range is suitable for feeding directly to a gas oil catalytic cracker, as can the 1050° F.− product after separation by distillation of the 1050° F.+ fraction. The 1050° F.+ fraction from the bottom of the distillation column is suitable for admixing with a fluxing material to form a low sulfur fuel oil, or can be recycled.

In a highly preferred mode of operation a plurality of reactors (reaction zones), or a plurality of reactor trains (series), are operated in parallel, each reactor or train of reactors being operated at different time sequences between start-of-run (SOR) and end-of-run (EOR) conditions such that the composite product from the several reactors, or reactor trains, is of substantially uniform quality throughout the operation. Suitably, from one to about four reactors are provided in a single train (or set), from about three to about four trains of the reactors, or sets of reactors, are provided in parallel, and a train of from one to about four reactors (or a set) are utilized as swing reactors. In such operation, one set of reactors are removed from production while the catalyst is regenerated, or recharged with fresh catalyst, and the operation of the several trains (or sets) of reactors which are operated in parallel is staged between a time "zero," measured as start-of-run, and a final time measured at the conditions existing at end-of-run. Composite product from the trains of parallel reactors, operated at different levels of conversion between a high at time zero and a low at end-of-run, to provide constant product quality is passed to a distillation zone and split into a 1050° F.+ product (which is recycled or fluxed and used as a low sulfur fuel oil) and a 1050° F.− product suitable for direct use as a catalytic cracker feed, or suitable for further refining to produce a feed of such quality.

It is necessary to hydro process heavy feeds at high levels of conversion, and desulfurization, particularly in view of our present energy short environment. In the conventional temperature increase mode of operation, temperature is gradually raised after start-of-run to maintain catalyst activity, the increasing temperature being raised adequately throughout the run to maintain higher conversion and desulfurization. With such feeds, in such mode of operation, catalyst deactivation rate is very high; and, the temperature increase requirement is correspondingly high. But, such type of operation has been considered necessary to convert the 1050° F.+ hydrocarbon to 1050° F.− products with maximum yields of gas oil for conventional catalytic cracker feed for conversion to gasoline and mid distillates. In accordance with the present invention, however, an operating run is commenced by operation at relatively high temperature and this temperature is maintained throughout the entire operating period. Surprisingly, it has been found that considerable benefits are provided by the constant temperature mode of operation vis-a-vis the temperature increase mode of operation.

The invention will be more fully understood by reference to the following non-limiting examples and comparative data which illustrate its more salient features. All parts are given in terms of weight units except as otherwise specified.

Table I below presents an inspection or analysis of the feed used in conducting the several runs.

TABLE I

| FEED ANALYSIS | Venzuelan Crude |
|---|---|
| Gravity, ° API | 8.3 |
| Sulfur, Wt. % | 4.0 |
| Carbon, Wt. % | 84.94 |
| Hydrogen, Wt. % | 10.41 |
| Con Carbon, Wt. % | 15.0 |
| Asphaltenes, Wt. %. | 16.0 |
| Nitrogen, Wt. % | 0.621 |
| Metals, ppm |  |
| Ni | 100 |
| V | 450 |
| Vol. % 1050° F. + | 47.5 |
| Wt. % 1050° F. + | 50.7 |
| Wt. % Oxygen | 0.69 |

Table II below presents inspections for the different catalysts used in conducting the several runs.

TABLE II

| CATALYST INSPECTIONS | | | |
|---|---|---|---|
| Catalyst | A Small Pore | B Intermediate Pore | C Large Pore |
| Surface Area, m²/gm | 260 | 193 | 405 |
| Pore Volume (PV), cc/gm | 0.51 | 0.58 | 1.68 |
| Pore Size Diameter, % PV in | | | |
| 0–50A | 10.6 | 9.9 | 1.8 |
| 50–100A | 61.7 | 17.6 | 6.4 |
| 100–200A | 23.4 | 31.4 | 22.2 |
| 200–300A | 2.1 | 21.6 | 33.9 |
| 300–400A | 2.1 | 13.7 | 17.5 |
| 400A+ | — | ~0.7 | ~5.1 |

In a first series of demonstrations, since it was known that high temperature operation (ca. 800° F. or higher) is required for high conversion of 1050° F.+ material, three catalysts, A, B, and C (Table II), were selected for hydroconversion of the heavy Venezuelan crude (Table I) at 800° F. SOR temperature. A TIR of ca. 3°–4° F./day was imposed upon the catalysts in an attempt to compensate for catalyst deactivation and to produce a product with essentially constant 1050° F.+ conversion over the length of the run. The process conditions imposed are described in Table III, which lists runs made with each of Catalysts A, B, and C; and an additional run made with Catalyst C.

TABLE III

| Process Conditions Catalyst | A | B | C | C |
|---|---|---|---|---|
| Temperature, ° F. SOR |  |  | 802 |  |
| Temperature, ° F. EOR | 820 | 818 | 820 | 820 |
| Hours on Stream[(1)] | 169 | 140 | 200 | 149 |
| Pressure, psig |  |  | 2250 |  |
| V/Hr./V | 0.7 | 0.7 | 0.35 | 0.7 |
| SCF/B H₂ |  |  | 6000 |  |

[(1)]Runs terminated due to reactor plugging.

Data from these runs show that all of the catalysts provided good initial desulfurization and demetallization along with good 1050° F.+ conversion. Catalysts A and B, it will be noted, began to decline very early in the run with respect to demetallization though good hydrodesulfurization performance was retained. Catalyst C retained both hydrodesulfurization and demetallization performance throughout the run. However, when a temperature of 810° F. was reached, all reactors gave evidence of formation of incompatible materials. Shortly thereafter reactor plugging occurred as a result of the formation of these incompatible materials and each run had to be terminated. No significance is attached to the differing run lengths attained with each catalyst in this test. Generally, it has been found that incompatibles begin to form at about 760°–780° F. with catalysts A and B, the smaller pore catalysts, whereas the large pore catalyst can attain temperatures of 800°–810° F. before significant formation of incompatibles is attained.

EXAMPLE 1

For purposes of comparison, additional runs were initiated at generally the same conditions using the same catalysts, but in this case the temperature was maintained constant at 800° F. throughout the run. The conditions maintained during these runs, and the results are as recorded in Table IV.

TABLE IV

| Catalyst | A<br>Small<br>Pore | B<br>Intermediate<br>Pore | C<br>Large<br>Pore |
|---|---|---|---|
| Pressure, psig | | 2250 | |
| Temperature, ° F. | | 800 | |
| V.Hr./V | | 0.7 | |
| SCF/B H$_2$ | | 6000 | |
| Hours on Stream[1] | 576 | 788 | 885[3] |
| Wt. % Conversion[2] | | | |
| Sulfur | 35 | 61 | 67 |
| Nickel | 49 | 67 | 84 |
| Vanadium | 71 | 86 | 95 |
| 1050° F. + | ~30 | ~50 | ~57 |

[1] Severe reactor plugging occurred and the run was terminated some time thereafter.
[2] At end-of-run hours noted in table.
[3] Run continued to run hour 1014 with similar performance but with pressure control problems due to plugging.

No visable formation of incompatibles was noted in these runs, but due to the earlier plugging of the smaller pore catalysts it is apparent that some incompatibles were forming in these reactors. The longer run length of the reactor containing the large pore catalyst, nontheless, clearly indicates a great reduction in the formation of incompatible materials. Thus, constant temperature operations at 800° F. permits run lengths of >30 days, particularly with the large pore catalyst.

Of equal importance to suppressing the formation of materials, with the elimination of plugging, the performance of the large pore catalyst at these conditions is clearly superior to both Catalysts A and B in the conversion of sulfur, nickel, vanadium and 1050° F.+ materials. Moreover, during most of the run Catalyst C was very effective in cleaning up and converting the feed. For example, up to run hour 300, the hydrodesulfurization rate exceeded 90%, up to run hour 623, the amount of nickel removal exceeded 89–90%, up to run hour 836, the amount of vanadium removal exceeded 97%, and up to run hour 576, the amount 1050° F.+ conversion exceeded approximately 60 Wt. %.

It is evident from the foregoing examples that it is desirable to operate at high temperatures to remove sulfur, nickel and vanadium and to convert 1050° F.+ materials. The data also show that, for best results, it is also essential that temperatures in excess of 810° F. be avoided to insure that incompatible formation, with concomitant plugging, be minimized. Thus, it appears that constant temperature operation at or near 800° F. is best. Operation in this mode, however, obviously creates a problem due to constantly diminishing product quality. This, of course, is due to the decline in catalyst activity with time, which effect in a conventional hydrodesulfurization process, is compensated for by increasing the temperature throughout the run to compensate for activity decline and thereby produce a product of constant sulfur content.

According to this invention a system has been developed wherein several reactor trains can be operated in parallel and the product from each train blended so that constant product quality can be maintained. This is accomplished by staggering the startup of each train such that they are out of phase. For example, in an installation where 4 reactor trains are needed to produce design capacity (each train may contain 1 or more reactors) it is advantageous to adjust the cycle length so that the time on stream equals 4 times the turn-around time. Thus, for 30 days operating time, the turnaround time should be 7.5 days for a total cycle time of 37.5 days. With this arrangement 5 reactor systems are required, one of which is always on turnaround and 4 of which are always operating.

EXAMPLE 2

Such system was compared against a typical hydrodesulfurization (HDS) design wherein the temperature was increased from 720° to 790° F. to maintain a constant sulfur product (93.1% HDS) over a 30 day operating time. Catalyst C was employed in such run. Such operation was compared with the parallel train system designed with the same catalyst consumption rate, same reactor volume, and pressure requirements. The latter system was designed to operate at a constant temperature of 800° F. with the same level of HDS (93.1%) throughout the run. Results of the comparison are shown in Table V.

TABLE V

| Average Conversion<br>Over 30 Day<br>Period | Typical HDS<br>System with<br>TIR | Constant Temperature<br>Staggered Parallel<br>Reactor Trains |
|---|---|---|
| 1050° F. + Conv., % | 50.8 | 67.4 |
| Con Carbon Removal, % | 70.2 | 75.6 |
| Nickel Removal, % | 92.1 | 93.1 |
| Vanadium Removal, % | 95.6 | 98.7 |

The data clearly show an advantage for the constant temperature, staggered parallel reactor train system over the typical HDS system wherein a TIR is imposed upon the system. Since the objective of this system is to maximize 1050° F.+ conversion, the system of this invention is decidedly superior to the conventional TIR system (67.4 vs. 50.8% 1050° F.+ conversion).

Moreover, the uniformity of degree of 1050° F.+ conversion with time from a single reactor train using the constant temperature mode is increased as contrasted with the TIR system. This effect smooths out the operation of downstream processing equipment such as fractionating towers, when single train operation is required. This is demonstrated in Table VI.

TABLE VI

| Mode | Constant Temp. | TIR |
|---|---|---|
| % 1050° F. + Conv.,<br>High/Low | 74.2/63.9 | 62.2/28.1 |
| Ratio | 1.16 | 2.21 |

In the constant temperature operation the downstream processing equipment will see only 16% swing in conversion level whereas the TIR system, in contrast, will undergo swings in conversion amounting to some 120%.

It is apparent that various modifications and changes can be made without departing the spirit and scope of the present invention.

Pore size distributions, as percent of total pore volume, for purpose of the present invention are measured by nitrogen adsorption wherein nitrogen is adsorbed at various pressures using the Aminco Adsorptomat Cat. No. 4-4680, and multiple sample accessory Cat. No. 4-4685. The detailed procedure is described in the Aminco Instruction Manual No. 861-A furnished with the instrument. A description of the Adsorptomat prototype instrument and procedure is given in Analytical Chemistry, Volume 32, page 532, April, 1969.

An outline of the procedure is given here, including sample preparation.

From 0.2 to 1.0 g. of sample is used and the isotherm is run in the adsorption mode only. All samples are placed on the preconditioner before analysis where they are out-gassed and dried at 190° C. under vacuum ($10^{-5}$ torr) for 5 hours. After pretreatment the weighed sample is charged to the Adsorptomat and pumped down to $10^{-5}$ torr. At this point, the instrument is set in the automatic adsorption mode to charge a standard volume of gas to the catalyst. This is done by charging a predetermined number of volumes as doses and the allowing time for adsorption of the nitrogen to reach equilibrium pressure. The pressure is measured in terms of its ratio to the saturation pressure of boiling liquid nitrogen. Three doses are injected and 8 minutes allowed for equilibration of each measured relative pressure. The dosing and equilibration are continued until a pressure ratio of 0.97 is exceeded and maintained for 15 minutes. The run is then automatically terminated.

The data obtained with the dead space factor for the sample, the vapor pressure of the liquid nitrogen bath, and the sample weight are sent to a digital computer which calculates the volume points of the isotherm, the B.E.T. area, and the pore size distribution of the Barrett, Joyner, and Halenda method. [Barrett, Joyner, and Halenda, J. Am. Chem. Soc. 73, p. 373.] It is believed that the Barrett, Joyner, and Halenda method is as complete a treatment as can be obtained, based on the assumptions of cylindrical pores and the validity of the Kelvin equation.

Hydrocarbon or hydrocarbonaceous feedstocks which can be treated pursuant to the practice of this invention include heavy petroleum crudes, synthetic crudes derived from coal, shale, tar sands, heavy oils and tars which contain relatively high concentrations of asphaltenes, high carbon: hydrogen ratios, high metals contents, considerable amounts of sand and scale, considerable amounts of 1050° F.+ materials, and generally high sulfur and nitrogen.

Having described the invention, what is claimed is:

1. In a process for the demetallization and conversion of the 1050° F.+ materials of a heavy metals containing hydrocarbon feed to 1050° F.− material by
    contacting said feed, in the presence of added hydrogen, with a catalyst characterized as comprising a composite of from about 5 to about 30 percent of a Group VIB metal, or compound thereof, from about 1 to about 12 percent of a Group VIII metal, or compound thereof, or admixture of said Group VIB and Group VIII metals, or compounds thereof, and a porous inorganc oxide support,
    at severity sufficient to convert at least about 30 percent of the 1050° F.+ material to 1050° F.− material, while removing at least about 80 percent of the heavy metals from the feed,
    the improvement comprising
    initiating the reaction at a preselected temperature within a range of from about 775° F. to about 825° F. sufficient to convert the 1050° F.+ materials, but insufficient to form a significant amount of incompatible materials, and continuing the conversion throughout the operating period to end-of-run at essentially the same temperature.

2. The process of claim 1 wherein the temperature of operation ranges between about 795° F. and about 805° F. from start-of-run to end-of-run.

3. The process of claim 2 wherein the temperature deviation ranges no more than about ±5° F. during the operation.

4. In a process for the demetallization and conversion of the 1050° F.+ materials of a heavy metals containing hydrocarbon feed to 1050° F.− material by
    contacting said feed, in the presence of added hydrogen, with a catalyst characterized as comprising a composite of from about 5 to about 30 percent of a Group VIB metal, or compound thereof, from about 1 to about 12 percent of a Group VIII metal, or compound thereof, or admixture of said Group VIB and Group VIII metals, or compounds thereof, and a porous inorganic oxide support, said catalyst including a combination of properties comprising, when the catalyst is of size ranging up to 1/50 inch average particle size diameter, at least about 20 percent of its total pore volume of absolute diameter within the range of about 100A to about 200A; when the catalyst is of size ranging from about 1/50 inch up to 1/25 inch average particle size diameter, at least about 15 percent of its total pore volume of absolute diameter within the range of about 150A to about 250A; when the catalyst is of size ranging from about 1/25 inch to about 1/8 inch average particle size diameter, at least about 15 percent of its total pore volume of absolute diameter within the range of about 175A to about 275A; a surface area ranging at least about 200 m²/g to about 600 m²/g and a pore volume ranging from about 0.8 cc/g to about 3.0 cc/g,
    at severity sufficient to convert at least about 30 percent of the 1050° F.+ material to 1050° F.− material, while removing at least about 80 percent of the heavy metals from the feed,
    the improvement comprising
    initiating the reaction at a preselected temperature within a range of from about 775° F. to about 825° F. sufficient to convert the 1050° F.+ materials, but insufficient to form a significant amount of incompatible materials, and continuing the conversion throughout the operating period to end-of-run at essentially the same temperature.

5. The process of claim 4 wherein the temperature of operation ranges from about 795° F. to about 805° F. from start-of-run to end-of-run.

6. The process of claim 5 wherein the temperature deviation ranges no more than about ±5° F. during the operation.

7. The process of claim 4 wherein the catalyst is further characterized as including, when the catalyst is of size ranging up to 1/50 inch average particle size diameter, at least about 25 percent of its total pore volume of absolute diameter within the range of about 100A to about 200A; when the catalyst is of size ranging from about 1/50 inch up to 1/25 inch average particle size diameter, at least about 20 percent of its total pore volume of absolute diameter within the range of about 150A to about 250A; when the catalyst is of size ranging from about 1/25 inch to about ⅛ inch average particle size diameter, at least about 20 percent of its total pore volume of absolute diameter within the range of about 175A to about 275A; surface areas ranging at least about 200 m²/g to about 600 m²/g, with pore volumes ranging from about 0.8 to about 3.0 cc/g (B.E.T.).

8. The process of claim 4 wherein the catalyst is further characterized as including, when the catalyst is of size ranging up to 1/50 inch average particle size diameter, at least about 70 percent of its total pore volume of absolute diameter within the range of about 100A to about 200A; when the catalyst is of size ranging from about 1/50 inch up to 1/25 inch average particle size diameter, at least about 45 percent of its total pore volume of absolute diameter within the range of about 150A to about 250A; when the catalyst is of size ranging from about 1/25 inch to about ⅛ inch average particle size diameter, at least about 30 percent of its total pore volume of absolute diameter within the range of about 175A to about 275A; surface areas ranging at least about 250 m²/g to about 450 m²/g, with pore volumes ranging from about 1.1 to about 2.3 cc/g (B.E.T.).

9. The process of claim 4 wherein the catalyst is further characterized as including

| Distribution of Pore Diameters | |
|---|---|
| 1/500 up to 1/50" | |
| 0–50A | <20% |
| 100–200A | >20% |
| 300A+ | <30% |
| Pore Volume, cc/g | 0.8–1.4 |
| Surface Area, m²/g | 300–450 |
| 1/50 up to 1/25" | |
| 0–50A | <10% |
| 150–250A | >15% |
| 350A+ | <35% |
| Pore Volume, cc/g | 1.1–1.7 |
| Surface Area, m²/g | 320–475 |
| 1/25 up to 1/8" | |
| 0–50A | <5% |
| 175–275A | >15% |
| 350A+ | <40% |
| Pore Volume, cc/g | 1.3–1.9 |
| Surface Area, m²/g | 340–500 |

10. The process of claim 4 wherein the catalyst is further characterized as including

| Distribution of Pore Diameters | |
|---|---|
| 1/500 up to 1/50" | |
| 0–50A | <10% |
| 100–200A | >25% |
| 300A+ | <25% |
| Pore Volume, cc/g | 0.9–1.5 |
| Surface Area, m²/g | 310–500 |
| 1/50 up to 1/25" | |
| 0–50A | <5% |
| 150–250A | >20% |
| 350A+ | <30% |
| Pore Volume, cc/g | 1.3–1.9 |
| Surface Area, m²/g | 340–575 |
| 1/25 up to 1/8" | |
| 0–50A | <4% |
| 175–275A | >20% |
| 350 A+ | <35% |
| Pore Volume, cc/g | 1.5–2.1 |
| Surface Area, m²/g | 350–600 |

11. The process of claim 4 wherein the catalyst is further characterized as including

| Distribution of Pore Diameters | |
|---|---|
| 1/500 up to 1/50" | |
| 0–50A | <2% |
| 100–200A | >70% |
| 300A+ | <1% |
| Pore Volume, cc/g | 1.1–1.7 |
| Surface Area, m²/g | 325–550 |
| 1/50 up to 1/25" | |
| 0–50A | <1% |
| 150–250A | >45% |
| 350A+ | <7% |
| Pore Volume, cc/g | 1.5–2.1 |
| Surface Area, m²/g | 360–600 |
| 1/25 up to 1/8" | |
| 0–50A | <3% |
| 175–275A | >30% |
| 350A+ | <25% |
| Pore Volume, cc/g | 1.8–2.3 |
| Surface Area, m²/g | 370–650 |

* * * * *

UNITED STATES PATENT OFFICE
CERTIFICATE OF CORRECTION

Patent No. 3,998,722          Dated December 21, 1976

Inventor(s) Francis X. Mayer et al.

It is certified that error appears in the above-identified patent and that said Letters Patent are hereby corrected as shown below:

On the Title Page, Item [73] should read:

--- Exxon Research and Engineering Co., A corp.,
       of Delware ---.

Signed and Sealed this

Twenty-sixth Day of April 1977

[SEAL]

*Attest:*

RUTH C. MASON
*Attesting Officer*

C. MARSHALL DANN
*Commissioner of Patents and Trademarks*